United States Patent Office 3,091,224
Patented May 28, 1963

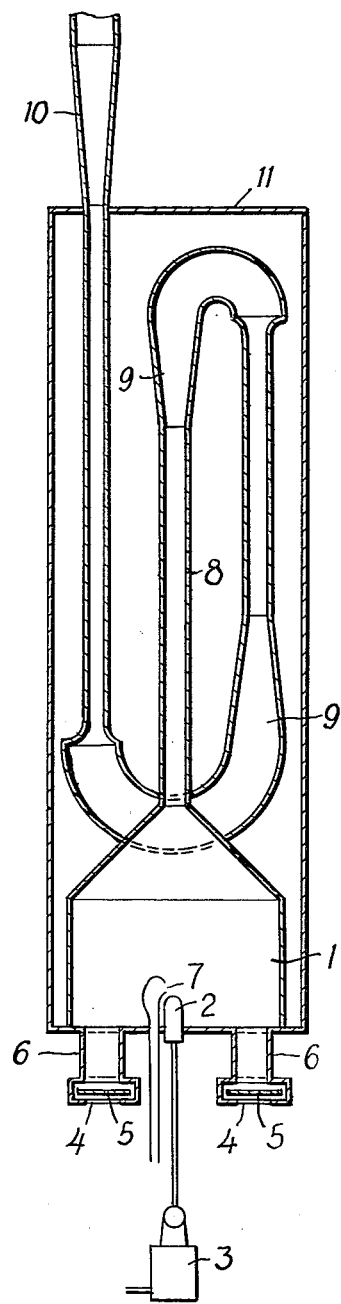

3,091,224
DEVICE FOR INTERMITTENT COMBUSTION
John Anders Rydberg, Stockholm, Sweden, assignor to Aktiebolaget Gustavsbergs Fabriker, a corporation of Sweden
Filed Dec. 6, 1956, Ser. No. 626,667
Claims priority, application Sweden Dec. 16, 1955
2 Claims. (Cl. 122—24)

This invention relates to a fluid heating system comprising a hot gas generator and a heat exchanger for transferring heat from hot gases produced by the generator to a fluid to be heated, the generator operating on the principle of intermittent combustion, comprising a combustion chamber having openings with non-return valves for the supply of air, means for the supply of preferably liquid fuel, and an outlet for the products of combustion. Combustion devices of this type have been used, for instance, for the propulsion of jet-driven projectiles by means of reactive forces exerted by the exhaust gases. In these devices, the fuel has been injected continuously, and the frequency of the combustion periods has been determined by the comparatively high resonance frequency of the device. As a result thereof, such devices cause audible acoustic oscillations with great force of sound.

The primary object of the invention is to provide means rendering possible the use of a combustion device of the type referred to in steam boilers, hot water boilers, ovens and the like. Due to the high gas velocities occurring in such a combustion device, a very favourable heat transfer can be obtained between the device and a medium to be heated. Hitherto, this has been considered impossible in practice on account of the fact that the great force of sound emitted by the combustion device has made it impossible to install the device within inhabited regions.

The combustion device according to the invention is substantially characterized by the fact that the fuel supply means are positively controlled to supply fuel intermittently and at a frequency which at the most equals the reasonance frequency of the device and is lower than 50 periods per second, and that the outlet of the combustion chamber is connected to a heat exchanger for recovering heat from the products of combustion.

The sensibility of the human ear to such low frequencies is considerably less than to higher frequencies. With a positively controlled intermittent supply of fuel there is also obtained the advantage that at low frequencies the combustion periods can be prolonged by a suitable choice of the duration of the fuel injection periods. If the fuel is injected so slowly that combustion starts before the entire fuel quantity has been injected, there results a gradual combustion without sudden explosion. Consequently, the duration of the fuel injection period should be variable. As a result of the above features the force of sound emitted by the device can be reduced to tolerable values. The intermittent supply of fuel also results in other advantages. The course of combustion becomes much more stable than in the case of continuous supply of fuel where the explosions are dependent upon the intermittent supply of air which is obtained when the device oscillates at its resonance frequency. The increased instability in this case is a result of the fact that a certain excess of air is always required in practical combustion. Intermittent supply of fuel further results in that the combustion is easily controllable and facilitates the start of the device. Further, it is easier to secure a complete and economic combustion.

An embodiment of the invention is illustrated in the annexed drawing.

Numeral 1 denotes a combustion chamber provided with a fuel injection nozzle 2 to which fuel is supplied intermittently by means of a pump 3 which may be of the type used in diesel engines. The combustion chamber 1 has air supply openings 4 which are controlled by non-return valves 5 and located at the ends of short ducts 6. An electric ignition device is indicated at 7.

The combustion chamber is connected to a single and comparatively long discharge duct 8 which comprises several straight portions interconnected by bends. In front of each bend there is provided a diffuser 9 to reduce the velocity and flow losses in the bends. A further diffuser 10 is connected to the end of the discharge duct 8.

The combustion chamber 1 as well as the discharge duct 8 are enclosed by a shell 11 which may be filled with water for heating purposes or for generating steam.

The mode of operation of the device described is as follows.

An atomized jet of fuel is injected through the nozzle 2 to be mixed with air in the combustion chamber 1 so as to be ignited more or less explosion-like, thereby increasing the pressure in the chamber 1. As a result thereof, the non-return valves 5 will be closed and the products of combustion will be forced at a high velocity through the discharge duct 8. Due to the kinetic energy of the mass of gases discharged, a partial vacuum will be created in the combustion chamber 1 so that the non-return valves 5 will open and fresh air will rush into the combustion chamber. The pump 3 simultaneously delivers a fresh quantity of fuel through the nozzle 2, and the cycle described will be repeated. After some time the temperature in the combustion chamber 1 which may be lined with refractory bricks or a similar material has been increased so much that the fuel-air mixture will be ignited by itself without the aid of the electric ignition member 7.

From the above it will be apparent that the frequency of the intermittent combustion is determined by the number of revolutions of the pump 3. In accordance with the invention, this frequency is comparatively low and less than 50 periods per second. Consequently, the force of sound emitted by the device will be within tolerable values, since, as previously pointed out, the human ear is considerably less sensitive to low frequencies than to high frequencies. The frequency may be varied by variation of the number of revolutions of the pump, while the length of the injection period and the quantity of fuel injected may be varied at a constant frequency by variation of the effective stroke of the pump. Consequently, the conditions of operation may be changed upon variation of the output of the device such as to secure the most favourable results as regards the sound emitted by the device.

Although not shown in the drawing, means may be provided for controlling the amount of air supplied to the combustion chamber during each suction period. Such means may consist of throttle members or the like for the air.

From the drawing it will be seen that the non-return valves 5 are located at the ends of the ducts 6 remote from the zone of combustion in the chamber 1. As a result thereof, the valves are comparatively well protected by cold air cushions in said ducts so that the valves are not subject to considerable heat and may be made from a low-quality material. For instance, the valve members may consist of diaphragms of rubber, plastic or similar material.

In order to provide for an intense mixing of fuel and air, guide vanes or similar members may be arranged in the ducts 6 to impart rotational movement to the incoming air. Further, the ducts may be constructed to open into the combustion chamber 1 in a manner such as to impart rotary movement to the gases in the chamber. The central nozzle 2 may be replaced by a plurality of nozzles located at different places. For instance, a nozzle may be provided at each duct 6.

The main object of the invention is to attain a high gas velocity in the discharge ducts and consequently a high transfer of heat and a small heating-surface, and at the same time to maintain the force of sound within tolerable values. A secondary object is to render possible the generation of a high amount of heat per unit of volume of the furnace, this object being obtained due to the effective mixing of air and fuel which is a result of the intermittent fuel injection and combustion. To obtain a high gas velocity, the total cross-sectional area of the discharge ducts should be small which contributes towards a decrease of the frequency. However, since the generation of heat per unit of volume of the furnace increases as the frequency increases, the cross-sectional area should not be too small. In accordance with the invention, the cross-sectional area is chosen such that the resonance frequency of the device will be equal to or lower than the lowermost audible frequency, that is, the lowermost frequency which the human ear can make out a tone. This frequency limit may be assumed to lie between 10 and 50 oscillations per second. Hitherto it was not possible to obtain such low resonance frequencies in a construction for continuous fuel injection. In contrast thereto, frequencies of 1 to 2 or even less oscillations per second are attainable in a device according to the invention with intermittent fuel injection.

The device according to the invention is primarily intended for the combustion of liquid fuel, but may equally well be constructed for gaseous or pulverized fuel. If the invention is applied to hot water or steam boilers, the long discharge ducts constitute the main part of the heating-surface and act as suction pipes for drawing combustion air into the chamber. In order to cool the flue gases sufficiently, the ratio of the length to the diameter of the discharge ducts should be sufficiently great. This ratio increases at increasing gas velocity. The high gas velocities occurring in a device according to the invention require ratios exceeding 180:1 which are considerably higher than the ratios required in conventional boilers.

It has proved difficult to provide sufficiently large inlet areas for the non-return valves. If the lengths of the discharge ducts are increased, the non-return valves may be made smaller and the suctions periods become shorter. Also the variations of the gas velocity in the discharge ducts become less if the lengths of the ducts are increased. For this reason it is important to make the discharge ducts rather long. Since, as pointed out above, sufficient cooling of the gases requires a certain value of the ratio of the lengths to the diameters of the discharge ducts and since this value should not be increased in view of the resulting increasing friction, the maximum lengths of the discharge ducts is obtained if the number of the ducts is limited to one. It is therefore advantageous to provide the device according to the invention with a single long discharge duct which in view of friction and other factors is preferably circular in cross-section.

In a device according to the invention gas velocities are obtained which exceed 100 and preferably 200 metres per second.

The invention is not limited to the embodiment described and illustrated in the drawing which merely represents the principle of the invention. The pump directly connected to the fuel injection nozzle may be replaced by a pressurized source of fuel in which case the intermittent supply of fuel may be controlled by an intermittently operating automatic or motor-driven cut-off valve. If a reciprocating pump is used, it need of course not be designed for such high pressures as are common in diesel-engine pumps but may be of a more simple construction.

What I claim is:

1. A fuel combustion and fluid heating system comprising a hot gas generator and a heat exchanger for transferring heat from hot gases produced by said generator to a fluid to be heated, said generator including a combustion chamber having air supply openings, non-return valve means controlling said openings, and controllable pump means intermittently supplying fuel directly into said combustion chamber at a frequency lower than the resonance frequency of the system and less than 50 periods per second, said heat exchanger including at least one discharge duct in communication at one end with said combustion chamber, the ratio of the length to the diameter of said duct being at least 180:1 and the cross-sectional area of said duct being small relative to the volume of the combustion chamber to achieve high velocity of the gases flowing through the duct, said duct including at least two generally linear portions which are joined successively in the direction of gas flow by a diffuser followed by a duct bend portion.

2. A fuel combustion and fluid heating system comprising a heat exchanger including a fluid-containing shell and a discharge duct in said shell, the ratio of the length to the diameter of said duct being at least 180:1, said duct including at least two generally linear portions which are joined successively in the direction of gas flow by a diffuser followed by a duct bend portion; and fuel combustion means comprising a combustion chamber within said shell at one end thereof, said combustion chamber having an outlet connected to said discharge duct and at least one air inlet, conduit means in communication at one end with the combustion chamber air inlet and extending longitudinally outwardly from the shell wall which is adjacent said combustion chamber, non-return valve means mounted in the other end of said conduit means remote from said combustion chamber for admitting air which is fed through said conduit means into said combustion chamber, and pump means for supplying fuel intermittently directly into the combustion chamber at a frequency which is lower than the resonance frequency of the system and below 50 periods per second.

References Cited in the file of this patent

UNITED STATES PATENTS

| | | |
|---|---|---|
| 2,004,945 | Holzwarth | June 18, 1935 |
| 2,480,626 | Bodine | Aug. 30, 1949 |
| 2,655,205 | Linderoth | Oct. 13, 1953 |
| 2,657,741 | Brierly | Nov. 3, 1953 |
| 2,708,926 | Huber | May 24, 1955 |
| 2,715,390 | Tenney et al. | Aug. 16, 1955 |
| 2,717,637 | Huber | Sept. 13, 1955 |
| 2,722,180 | McIlvaine | Nov. 1, 1955 |
| 2,748,753 | Serrazin | June 5, 1956 |
| 2,761,283 | Houle | Sept. 4, 1956 |
| 2,768,031 | Tenney et al. | Oct. 23, 1956 |